United States Patent [19]

Kovacs

[11] Patent Number: 5,487,894
[45] Date of Patent: Jan. 30, 1996

US005487894A

[54] COMPOSITION OF DEHYDRATED POWDERED MUNG BEAN SPROUT AND PLANT FIBER FOR USE AS DIETARY SUPPLEMENT IN HEALTHCARE

[76] Inventor: Joseph Kovacs, 22 Ch. Du Pommier, 1218 Geneva, Switzerland

[21] Appl. No.: 358,367

[22] Filed: Dec. 19, 1994

[51] Int. Cl.$^6$ .................................................. A61K 35/78
[52] U.S. Cl. ..................... 424/195.1; 424/451; 424/457; 424/464; 424/489; 424/682; 424/696; 514/909; 426/618; 426/629; 426/804
[58] Field of Search ................................ 424/195.1, 451, 424/457, 464, 489, 482, 464, 696; 514/909; 426/618, 629, 804

[56] References Cited

U.S. PATENT DOCUMENTS

| | | | |
|---|---|---|---|
| 4,465,696 | 8/1984 | Strahl | 426/63 |
| 4,665,099 | 5/1987 | Ramallo et al. | 514/763 |
| 4,976,982 | 12/1990 | Gillmore | 426/557 |
| 5,340,834 | 8/1994 | Stitt | 514/505 |

*Primary Examiner*—John W. Rollins
*Attorney, Agent, or Firm*—Beveridge, DeGrandi, Weilacher & Young

[57] ABSTRACT

A dietary supplement composition is disclosed which contains dehydrated mung bean sprout and beta-glucan enriched oat groat.

33 Claims, No Drawings

COMPOSITION OF DEHYDRATED POWDERED MUNG BEAN SPROUT AND PLANT FIBER FOR USE AS DIETARY SUPPLEMENT IN HEALTHCARE

INTRODUCTION AND BACKGROUND

The present invention relates to a composition in which substances of plant origin are present. These substances have important metabolic properties and function for use in connection with improving the dietary habits of the population. More particularly the present invention relates to shelf-stable, dehydrated bean sprout powder, combined with a particular plant fiber. In still greater detail, the invention relates to a dietary supplement containing as the principal ingredients the dehydrated sprouts of soya beans, or more particularly mung beans, together with β-Glucan enriched oat-groat. The resulting powdered composition can be used as a dietary supplement having a positive effect on mammalian health. In one aspect of the invention, a novel method is provided for producing one of the plant origin components.

In a further aspect, the present invention relates to a method for retarding the loss of muscle tissue for patients such as warm blooded mammals who are dieting and losing weight.

The origin and the practice of medicine and health care in many parts of the world involves the prescription of particular foods for a number of illnesses. Historically certain foods have been believed to have medicinal and health restoring properties.

In recent years, much publicity has surrounded the importance of diet in maintaining wellness and prevention of unhealthy conditions. In particular, there has been a focus on the prevention of cancer through the maintaining of a careful diet. There are many biologically plausible reasons why consumption of vegetables and fruits might slow or prevent the appearance of cancer. These include the presence of potentially anticarcinogenic substances such as carotenoids, vitamin C, vitamin E, selenium, dietary fiber and the like, usually called phytochemicals or bioactive compounds of plant origin.

At almost every stage of the cancer process, known phytochemicals can alter carcinogenesis. For example, such substances as flavonoids, phenols, indoles and tannins can induce a multiplicity of inactivating enzymes. Ascorbate and phenols block the formation of carcinogens such as nitrosamines; flavonoids and carotenoids can act as antioxidants, possibly disabling carcinogenic potential. Lipid-soluble compounds such as carotenoids and sterols may alter membrane structure. Some sulphur-containing compounds can suppress DNA-and protein synthesis; carotenoids suppress DNA-synthesis and enhance differentiation.

Today, Asiatic culture has a strong influence on our lifestyle. Soya can be considered as part of Asiatic culture and is widely recognized as a very healthy and nutritious food from Asia.

A recent international symposium dealt with the subject of the role of soya in preventing and treating chronic diseases and summarized some of the known health effects of soya. It is a widely accepted fact that soya is beneficial for heart disease due to its cholesterol lowering effect.

Soya is one of the richest protein sources of known food; much more than meat. According to references, the special soy protein might be responsible for the cholesterol lowering effect, probably by stimulating cholesterol metabolism.

Recently isoflavones of soya stimulated interest as a potential health protecting agent. Genistein has been identified as a major flavonoid and has been investigated for a beneficial health effect.

SUMMARY OF THE INVENTION

An object of the present invention is to provide a dietary supplement composition containing a mung bean product and a particular plant fiber product to obtain an enhanced effect from both components.

Another object of the present invention is to treat warm blooded mammals who are on a weight control program to achieve a desired balance of fat loss and muscle tissue loss through a plan of monitored food intake including a dietary supplement.

In achieving the above and other objects, one feature of the invention resides in a dietary composition comprising dehydrated, powdered mung bean sprout and oat groat fiber, as a dietary supplement.

According to a further feature of the invention there is provided a new method for obtaining a special type of dehydrated mung bean sprout having properties uniquely suited for inclusion in a dietary supplement.

Another feature of the invention is in the treatment of obesity in warm blooded mammals. The treatment is seen to protect against muscle loss in a weight loss program. In carrying out the treatment aspect of the invention, the combination of dehydrated, powdered mung bean sprout and oat groat fiber can be taken or administered to the warm blooded mammal in need thereof in various forms such as dried powder mixed with liquid, as a pill, tablet or capsule as part of a regulated diet. The dietary supplement product of this invention has excellent shelf life.

DETAILED EMBODIMENTS OF THE INVENTION

Mung bean is a green soya or more precisely "phaseoulus aureus". The green colored grain is sprouted in the dark and subsequently dehydrated by lyophilization or aerial drying. This vegetable has been used throughout history for thousands of years as food and considered to be extremely nutritious. Americans usually consume this legume in the form of bean sprouts.

This crop has been cultivated in India for thousands of years. It was brought from there to China and southeast Asia. In recent times it has been introduced into the United States as well. Much of the world's mung bean crop is grown in Asia because the crop does well when the temperature ranges between 68° F. (20° C.) and 113° F. (45° C.).

In different countries and cultures, the mung bean is processed into a food product in different ways. The beans are dried, debranned, and ground into flour in India and Pakistan, whereas in China and the United States they are usually allowed to sprout. Certain American producers of Chinese foods either carry out canning of the sprouts alone in water, or mix them with other Chinese vegetables such as water chestnuts.

Dried bean seeds are widely available in stores that cater to customers of Chinese descent, and in health or natural food stores. However, the canned sprouts are available in most large supermarkets. Sprouts may be prepared from the dry beans by (1) soaking in water overnight, (2) draining the water and placing the soaked beans in a container in the dark for 2 to 7 days, and (3) keeping the beans moist while draining off the old water two or more times daily. Allowing the seeds to stand for too long in the old water may bring about spoilage before sprouting. These methods are well known in the art. A pound (0.45 kg) of dry beans yields from 6 to 8 pounds (2.7 to 3.6 kg) of sprouts. Such known products are not shelf stable.

The high water content of about 90% makes mung bean sprouts low in solids and calories. Furthermore, the protein in mung beans is quite deficient in the sulfur amino acids. In China, this deficiency is corrected in part by eating the beans or their sprouts with cereal products such as rice, or with small amounts of eggs, fish, meat, or poultry. The other protein sources balance the amino acid deficiencies in the legume.

The germination of the grains starts by soaking in water for the purpose of activating enzymes that are useful in baking and brewing. The enzymes activated during the sprouting digest the stored carbohydrates and proteins to sugars and amino acids which will support the growth of the embryonic plant. For example, in beer production the malt producer stops the germination right after the emergence of sprouts by careful heating and drying so as to retain the desired enzyme activity. Methods and procedures for sprouting mung beans are well known in the art.

The mung bean sprout used in the present invention is prepared in a way so it has a low bacterial count. This is referred to in the art as a low T.P.C. which means a low Total Plate Count of bacteria, as determined by counting the number of bacteria on a standard plate of standard culture in one gram of product. Bacterial count is sometimes expressed as CFU (colony forming unit). This determination is well known and understood in the art. Typically mung bean sprouts have a very high bacterial content; i.e. a T.P.C. of several million. The mung bean sprout of the invention has a low T.P.C.; i.e., less than 10,000 and generally a few thousand to less than 10,000.

The low bacterial count is achieved by contacting the fresh sprout with an aqueous solution of a lower monocarboxylic acid such as formic acid, acetic acid, and propionic acid at a concentration of about 0.5 or more depending on time and temperature on a weight per volume basis; e.g. g/l. Concentrations are not critical. At higher concentrations, shorter times and/or higher temperature can be used. Any suitable processing equipment can be used for this process. The reaction is usually conducted under ambient conditions; e.g., 10°–50° C., preferably 25° C. for 10 to 30 minutes.

Dehydration can be readily accomplished by freeze drying or air drying under conventional conditions. As a result of this process, a dehydrated mung bean sprout product of low T.P.C. as defined above is obtained.

The second major component of the composition of the present invention is the oat component and it has a long history in the art of food. Throughout history, oats were considered as a healthy and nutritious food. Even presently, the main use of oats is for animal feed. Human consumption of oats increased tremendously due to muesli, the popular cereal breakfast. Oats are now included in many food items such as cereals, breakfast foods in general and bakery products.

The oat kernel has a fibrous hull, which is not edible by humans. So, the goal in milling oats is to obtain the maximum yield of clean, uniform, sound, whole oat kernels which are free from hulls, floury material, extraneous matter, and undesirable flavors.

The milling of oats involves the following steps:

1. Cleaning. Foreign material and oats not suitable for milling are first removed.

2. Drying and roasting. The grain is subjected to heat and the moisture is reduced to somewhere between 7 and 8½%. This process develops flavor, improves keeping quality, and facilitates the subsequent separation of the hull from the groats.

3. Cooling. After drying, the oats are cooled by air circulation.

4. Hulling. The hulling machine separates the groat kernel from the surrounding hull. The following products are obtained from the hullers; hulls, groats, broken groats and meal, flour and unhulled oats. These materials are separated by air aspiration and screening. The choicest, plumpest groats are used to make package grade rolled oats, while the less choice groats make either bulk or feed rolled oats. The broken kernels are used as livestock feed.

5. Cutting. The purpose of cutting is to covert groats to uniform granules.

6. Flaking. The granules can be flaked if desired between rolls to produce a quick-cooking breakfast cereal.

Oats are an excellent source of fiber including soluble fiber which is associated with lowering of cholesterol. The main soluble fiber portion of oat bran is beta-glucan. Bran products of enriched beta-glucan content have been developed.

Numerous clinical studies support the fiber-cholesterol theory; See Uusitupa et al. J. Amer. College of Nutrition. Vol. 11, No. 6, 651–659 (1992.) It is also known that oats are associated with longevity. Recently antioxidants present in oats evoked much interest because of their role in eliminating radicals caused by oxidation. According to recent theory, based on medical observations, antioxidants may increase longevity.

The plant species *Avena Sativa* L. known as oats (Fam. Gramineae), has been known in the past for its nutritive and therapeutic properties. As described in the British Herbal Pharmacopoeia, published by the British Herbal Medicine Association 1976, part 1, page 27, *Avena Sativa* consists of the dehusked and rolled starchy seed endosperm of *Avena Sativa* L. (Fam. Gramineae). This product contains much starch, some protein and a little fat which contains some tocopherol. It is creamy white and buff, flaky mass with a mealy taste. It consists of mainly starch in ovate compound grains of 2 to many rounded-poly-hedral shaped grains, the individual grains being from 3 to 12 μm. On clearing the starch, oil globules are visible, and an aleurone layer of thick-walled cells with granular contents adjoins a layer of thin-walled, elongated cells in which occur a few thick-walled, small, circular cells. U.S.D. 22nd, Edn. p. 208–209.

The oat product used herein is called "oat-groat" and includes what is commonly referred to as "oat bran". It contains a beta-glucan component whereby the original beta-glucan content of the oat groat is increased several times. Thus the product is a beta-glucan enriched oat fiber. A source of this product is ALKO, a company of Finland, and is the subject of U.S. Pat. No. 5,106,640 relied on and entirely incorporated herein by reference. The soluble rich parts of oat groats are gently fractionated and processed into the product which has a uniquely high level of soluble oat fiber. The husks which contain mainly insoluble fiber are not used. The beta-glucan concentrate contains no preservative or additives and therefore is well suited for a dietary product for health and nutritional purposes. The beta-glucan concentrate has the following properties:

| Physical properties (typical values) | |
| --- | --- |
| Bulk density (kg//l) | 0.3 |
| Color | light yellow to light brown |
| Particle size | 95% passes 1 mm sieve |
| | 2% passes 0.125 mm sieve |
| Chemical properties (typical values) | |
| Total dietary fiber (% of dry matter) soluble fiber 14% insoluble fiber 21% | 35 |
| Protein (% of dry matter) | 25 |
| Starch (% of dry matter) | 25 |
| Fat (% of dry matter) | 11 |
| Mineral (% of dry matter) | 3 |
| Moisture (%) | 6 |
| Energy (cal/g) | 2.8 |
| Phytic acid (%) | 2.2 |
| Dietary fiber analysis (typical values, %) | |
| Macrocomponents | |
| Hemicellulose | 85 |
| Cellulose | 10 |
| Lignin | 4 |
| Pectins | 1 |
| Sugars | |
| Glucose | 59.4 |
| Xylose | 20.2 |
| Arabinose | 12.4 |
| Galactose | 1.8 |
| Mannose | 1.8 |
| Rhamnose | 0.2 |
| Uronic acids | 4.2 |
| Chemical properties | |
| Moisture | max. 10% |
| Total dietary fiber | min 32% ds |
| Soluble dietary fiber | min. 13% ds |
| Heavy metals | max. 0.5 ppm |
| Pesticides | not detected |
| Physical properties | |
| Color | light brown |
| Flavor | neutral |
| Foreign material | not detected |
| Granulations | |
| 1 mm sieve | min. 95% passes |
| 0.125 mm sieve | max. 2% passes |

Physiologically active proteins and peptides have been detected in dietary proteins. In the case of soybean protein, it is known that some components exert a hypocholesterolemic effect as compared with animal proteins. Recently, Iawami et al. reported a correlation between the plasma cholesterol level of rats fed with various proteins (casein, soybean protein isolate, gluten and ovalbumin) and the hydrophobicity of their peptic-pancreatic digested products, and moreover that, in the enzymatic products, those from soybean protein isolate were most abundant in hydrophobic peptides.

The dietary supplement compositions of the present invention are comprised of two major components; vig. dehydrated mung bean sprout and oat fiber. Ratios of components can vary but typically they are present in an amount of 1 to 1.5 parts of dehydrated mung sprout to 1 part of oat fiber. In addition to the two major components, a variety of fillers, flavoring agents, binders, minerals and vitamins as well as typical adjuvants used in the art can be used. Sorbitol as a sweetener can be mentioned as well as dicalcium phosphate and magnesium stearate as mineral agents are also suitable.

Typical formulations would include up to 40% by weight of such additives with the major components; i.e. bean sprout and oat fiber being present in an amount of at least 60% by weight. As used herein the terms "bean sprout" and "oat fiber" are intended to mean dehydrated mung bean sprout and beta glucan enriched oat groat, respectively.

The present invention will be illustrated by the following examples.

I. Compositions

| Example I | |
| --- | --- |
| Dehydrated powdered mung bean sprout | 330 mg |
| Oat fiber (beta-glucan enriched oat groat) | 300 mg |
| | 630 mg |

The above compositions can be made into tablets of 50 to 1500 mg using ordinary tableting machines known in the art.

| Example II | |
| --- | --- |
| Dehydrated powdered mung bean sprout | 330 mg |
| Oat fiber (beta-glucan enriched oat groat) | 300 mg |
| Sorbitol | 230 mg |
| | 860 mg |

| Example III | |
| --- | --- |
| Dehydrated powdered mung bean sprout | 300 mg |
| Oat Fiber | 200 mg |
| | 500 mg |

| Example IV | |
| --- | --- |
| Dehydrated powdered mung bean sprout | 300 mg |
| Oat Fiber | 200 mg |
| Wheat germ | 200 mg |
| | 700 mg |

| Example V | |
| --- | --- |
| Dehydrated powdered mung bean sprout | 300 mg |
| Oat Fiber | 200 mg |
| Sorbitol | 200 mg |
| | 700 mg |

2. PHARMACEUTICAL FORMULATIONS

| a) tablet | |
| --- | --- |
| Dehydrated powdered mung bean sprout | 330 mg |
| Oat Fiber (beta-glucan enriched oat groat) | 300 mg |
| Sorbitol | 230 mg |
| Dicalcium phosphate | 130 mg |
| Magnesium stearate | 10 mg |
| | 1,000 mg |

| b) tablet | |
| --- | --- |
| Dehydrated powdered mung bean sprout | 300 mg |
| Oat Fiber | 200 mg |
| Sorbitol | 200 mg |
| Dicalcium phosphate | 100 mg |
| Magnesium stearate | 10 mg |
| | 810 mg |

CAPSULE:

-continued

| | |
|---|---|
| Dehydrated powdered mung bean sprout | 200 mg |
| Oat Fiber | 150 mg |
| Sorbitol | 150 mg |
| Dicalciumphosphate | 100 mg |
| Magnesium stearate | 10 mg |
| | 610 mg |
| GRANULE: | |
| Dehydrated Powdered mung bean sprout | 300 mg |
| Oat Fiber | 200 mg |
| Sorbitol | 200 mg |
| Dicalcium phosphate | 100 mg |
| Ascorbic acid | 100 mg |
| Glycine | 100 mg |
| Magnesium stearate | 10 mg |
| | 1010 mg |
| TABLET WEIGHT: 50–1500 mg | |

Daily Prescription
3–6 tablets
6–9 capsules
3–6 packet of granules

USE IN A TREATMENT

The dietary supplement described herein can be used for weight control in conjunction with a dietary plan. This means that by self monitoring a program of weight loss by following the instruction book the patient can achieve control by retarding the proportion of muscle loss. In all weight loss programs, the proportion of fat loss and muscle loss is usually equal. By using the food supplement of this invention it is believed that the muscle tissue loss can be reduced.

In preparing the dietary products of the invention, a dry granulation technique is used that is well understood in the art. Typical equipment used is a roll compactor known as a "Chilsonator" made by the Fitzpatrick Company. The Chilsonator densifies the blended powder by passing the powder between high pressure rollers which compresses the powder and removes the air. The densified material is reduced to a uniform granule size and can be compressed into tablets after addition of a lubricant in accordance with conventional practice. The blending of the dehydrated powdered mung bean sprout, oat fiber and conventional excipients can be carried out with a powder blending machine. This equipment is well known in the art.

The dietary and pharmaceutical compositions of this invention will contain the dehydrated mung bean sprout and oat groat together with a solid or liquid pharmaceutically acceptable nontoxic carrier. Such pharmaceutical carriers can be sterile liquids, such as water and oils, including those of petroleum, animal, vegetable or synthetic origin, such as peanut oil, soybean oil, mineral oil, sesame oil and the like. Suitable pharmaceutical excipients include starch, glucose, lactose, sucrose, gelatine, malt, rice, flour, chalk, silica gel, magnesium carbonate, magnesium stearate, sodium stearate, glycerol monostearate, talc, sodium chloride, dried skim milk, glycerol, propylene glycol, water, ethanol and the like. These compositions can take the form of tablets, pills, capsules, powders, sustained-release formulations and the like. Suitable pharmaceutical carriers are described in "Remington's Pharmaceutical Sciences" by E. W. Martin. Such compositions will contain an effective therapeutic amount of the active ingredients together with a suitable amount of carrier so as to provide the form for proper administration to the host.

The compositions of this invention can further include a filler, flavoring agent, binder, mineral, vitamin as mixtures thereof. Tablets can be coated with a film and/or color layer for protection and color as is known in the art. These additives are conventional components of dietary products.

I claim:

1. A dietary supplement composition comprising dehydrated powdered mung bean sprout and oat groats.

2. The dietary supplement composition according to claim 1 wherein the mung bean sprout is present in an amount of 0.5 to 1.5 parts by weight per 1 part of oats or 0.5 to 1.5 parts by weight of oats per part of mung bean sprout.

3. The dietary supplement composition according to claim 1 wherein the composition is in the form of a tablet, capsule, sustained release formulation or powder.

4. The dietary supplement composition according to claim 1 which further comprises a filler, flavoring agent, binder, mineral, vitamin, or mixture thereof.

5. The dietary supplement composition according to claim 1 wherein said dehydrated mung bean sprout has a low bacterial count as determined by the total plate count of bacteria on a plate of culture.

6. The dietary supplement composition according to claim 5 wherein the low bacterial count is less than 10,000.

7. The dietary supplement composition according to claim 5 wherein the low bacterial count is from 100 to 10,000.

8. The dietary supplement composition according to claim 1 wherein said oats are of the plant species Avena Sativa L., Fam. Gramineae.

9. The dietary supplement composition according to claim 1 wherein said oat-groat is a beta-glucan enriched oat groat.

10. The dietary supplement composition according to claim 9 wherein said enriched oat groat is produced by fractionating soluble rich portions of oat groats to produce a beta-glucan enriched oat groat.

11. The dietary supplement composition according to claim 1 which is

| [Example I] | |
|---|---|
| Dehydrated mung bean sprout | 330 mg |
| Oat groat which is [fiber] [( beta glucan enriched oat groat )] | 300 mg |
| | 600 mg |

12. The dietary supplement composition according to claim 1 which comprises

| | |
|---|---|
| Dehydrated mung bean sprout | 330 mg |
| Oat groat which is [fiber] [( beta glucan enriched oat groat )] | 300 mg |
| Sorbitol | 230 mg |
| | 860 mg |

13. The dietary supplement composition according to claim 1 which is

| | |
|---|---|
| Dehydrated powdered mung bean sprout | 300 mg |
| Oat groat [Fiber] | 200 mg |
| | 500 mg |

14. The dietary supplement composition according to claim 1 which comprises

| | |
|---|---|
| Dehydrated Powdered mung bean sprout | 300 mg |
| Oat groat [Fiber] | 200 mg |
| Wheat germ | 200 mg |
| | 700 mg |

15. The dietary supplement composition according to claim 1 which comprises

| | |
|---|---|
| Dehydrated Powdered mung bean sprout | 300 mg |
| Oat groat [Fiber] | 200 mg |
| Sorbitol | 200 mg |
| | 700 mg |

16. The dietary supplement composition according to claim 1 which comprises

| | |
|---|---|
| Dehydrated mung bean sprout | 330 mg |
| Oat groat [fiber] | 300 mg |
| Sorbitol | 230 mg |
| Dicalcium phosphate | 130 mg |
| Magnesium stearate | 10 mg |
| | 1,000 mg |

17. The dietary supplement composition according to claim 1 which comprises

| | |
|---|---|
| Dehydrated Powdered mung bean sprout | 300 mg |
| Oat groat [Fiber] | 200 mg |
| Sorbitol | 200 mg |
| Dicalcium phosphate | 100 mg |
| Magnesium stearate | 10 mg |
| | 810 mg |

18. The dietary supplement composition according to claim 1 which comprises

| | |
|---|---|
| Dehydrated Powdered mung bean sprout | 200 mg |
| Oat groat [Fiber] | 150 mg |
| Sorbitol | 150 mg |
| Dicalciumphosphate | 100 mg |
| Magnesium stearate | 10 mg |
| | 610 mg |

19. The dietary supplement composition according to claim 1 which comprises

| | |
|---|---|
| Dehydrated Powdered mung bean sprout | 300 mg |
| Oat groat [Fiber] | 200 mg |
| Sorbitol | 200 mg |
| Dicalcium phosphate | 100 mg |
| Ascorbic acid | 100 mg |
| Glycine | 100 mg |
| Magnesium stearate | 10 mg |
| | 1010 mg |

20. A dietary supplement composition comprising dehydrated powdered mung bean sprout and oat groat, wherein said dehydrated mung bean sprout is prepared by contacting fresh sprout with an aqueous solution of a lower monocarboxylic acid and thereafter dehydrating to recover the dehydrated mung bean sprout.

21. The dietary supplement composition according to claim 20 wherein said acid is acetic acid, formic acid or propionic acid.

22. The dietary supplement composition according to claim 20 wherein said acetic acid is in a concentration of 0.5 up to 50% weight by volume.

23. The dietary supplement composition according to claim 22 wherein the concentration of the acetic acid is 10% by volume.

24. The dietary supplement composition according to claim 20 wherein the contacting is carried out under ambient conditions.

25. The dietary supplement composition according to claim 20 wherein the contacting is carried out at 10°–50° C. for 1 to 30 minutes.

26. The dietary supplement composition according to claim 20 wherein the dehydrating is done by freeze drying or air drying.

27. A method for improving dietary periodically a selected amount of a dietary supplement habits in mammals in need thereof comprising administering including dehydrated powdered mung bean sprout and oat groat fiber and monitoring the weight of the mammal being treated.

28. The method according to claim 27 wherein the mung bean sprout is present in an amount of 1 to 1.5 parts by weight per 1 part of oat groat.

29. The method according to claim 27 wherein the composition is in the form of a tablet, capsule, sustained release formulation or powder.

30. The method according to claim 27 wherein said dehydrated mung bean sprout has a low bacterial count as determined by the total plate count of bacteria on a plate of culture.

31. The method according to claim 27 wherein said oat groat is of the plant species *Avena Sativa* L., Fam. Gramineae.

32. The method according to claim wherein said oat groat is beta-glucan enriched oat groat.

33. The method according to claim 27 wherein the dietary supplement is administered in tablets of 50 to 1500 mg.

\* \* \* \* \*